United States Patent
Huang et al.

(10) Patent No.: US 11,721,811 B2
(45) Date of Patent: Aug. 8, 2023

(54) NEGATIVE ELECTRODE PLATE AND SECONDARY BATTERY

(71) Applicant: CONTEMPORARY AMPEREX TECHNOLOGY CO., LIMITED, Ningde (CN)

(72) Inventors: Yaping Huang, Ningde (CN); Mingkui Guo, Ningde (CN); Yaohui Wang, Ningde (CN); Yongshou Lin, Ningde (CN); Fenggang Zhao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 419 days.

(21) Appl. No.: 17/132,506

(22) Filed: Dec. 23, 2020

(65) Prior Publication Data

US 2021/0111410 A1 Apr. 15, 2021

Related U.S. Application Data

(63) Continuation of application No. PCT/CN2019/076661, filed on Mar. 1, 2019.

(30) Foreign Application Priority Data

Aug. 28, 2018 (CN) .......................... 201810989451.0

(51) Int. Cl.
| | |
|---|---|
| H01M 4/66 | (2006.01) |
| H01M 4/133 | (2010.01) |
| H01M 4/134 | (2010.01) |
| H01M 4/36 | (2006.01) |
| H01M 10/0525 | (2010.01) |
| H01M 4/02 | (2006.01) |

(52) U.S. Cl.
CPC ........... *H01M 4/661* (2013.01); *H01M 4/133* (2013.01); *H01M 4/134* (2013.01); *H01M 4/366* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | |
|---|---|---|
| 8,080,337 B2 | 12/2011 | Higuchi et al. |
| 2010/0086857 A1* | 4/2010 | Higuchi .................. H01M 4/38 429/231.95 |
| 2014/0287316 A1 | 9/2014 | Ahn et al. |
| 2015/0017549 A1 | 1/2015 | Nishimura et al. |
| 2016/0064737 A1 | 3/2016 | Ogawa et al. |
| 2017/0125788 A1 | 5/2017 | Ahn et al. |
| 2017/0133681 A1 | 5/2017 | Ko et al. |
| 2018/0287145 A1 | 10/2018 | Lee et al. |
| 2019/0296335 A1* | 9/2019 | Yao ........................ H01M 4/621 |

FOREIGN PATENT DOCUMENTS

| | | |
|---|---|---|
| CN | 101346835 A | 1/2009 |
| CN | 101997111 A | 3/2011 |
| CN | 104205467 A | 12/2014 |
| CN | 105074999 A | 11/2015 |
| CN | 106684326 A | 5/2017 |
| CN | 106935793 A | 7/2017 |
| CN | 108155363 A | 6/2018 |
| CN | 108417800 A | 8/2018 |
| EP | 3341988 A1 | 7/2018 |
| JP | 2013149403 A | 8/2013 |
| JP | 2015511389 A | 4/2015 |
| KR | 20150014800 A | 2/2015 |

OTHER PUBLICATIONS

Ningder Age New Energy Technology Co. Ltd., First Office Action, CN201810989451.0, dated Aug. 28, 2020, 12 pgs.
Contemporary Amperex Technology Co., Limited, Extended European Search Report, EP19854601.2, dated Sep. 6, 2021, 9 pgs.
Contemporary Amperex Technology Co., Limited, International Search Report and Written Opinion, PCT/CN2019/076661, dated May 30, 2019, 12 pgs.

* cited by examiner

*Primary Examiner* — Wyatt P McConnell
(74) *Attorney, Agent, or Firm* — Kilpatrick Townsend & Stockton LLP

(57) ABSTRACT

The present application relates to the electrochemical field, and in particular, to a negative electrode plate and a secondary battery including the electrode plate. The present application provides a negative electrode plate. The negative electrode plate includes a negative electrode current collector, a first negative electrode active substance layer disposed on at least one surface of the negative electrode current collector, and a second negative electrode active substance layer disposed on the first negative electrode active substance layer. The first negative electrode active substance layer includes a first negative electrode active substance, and the second negative electrode active substance layer includes a second negative electrode active substance. The first negative electrode active substance satisfies 1 GPa≤Young's modulus≤10 GPa, and the second negative electrode active substance satisfies 11 GPa≤Young's modulus≤30 GPa.

15 Claims, No Drawings

NEGATIVE ELECTRODE PLATE AND SECONDARY BATTERY

CROSS REFERENCE TO RELATED APPLICATIONS

This application is a continuation application of PCT Patent Application No. PCT/CN2019/076661, entitled "NEGATIVE ELECTRODE TAB AND SECONDARY BATTERY" filed on Mar. 1, 2019, which claims priority to Chinese Patent Application No. 201810989451.0, filed with the State Intellectual Property Office of the People's Republic of China on Aug. 28, 2018, and entitled "NEGATIVE ELECTRODE TAB AND SECONDARY BATTERY", all of which are incorporated herein by reference in their entirety.

TECHNICAL FIELD

The present application relates to the electrochemical field, and in particular, to a negative electrode plate and a secondary battery including the electrode plate.

BACKGROUND

Recently, demands in the traction battery market have been gradually growing, posing higher requirements for energy density and power density of traction batteries. Cost is also a key factor for a traction battery. In terms of increasing energy density, currently, when a material system remains unchanged, a coating weight is usually increased, so as to increase the energy density of the battery. However, this will greatly deteriorate power performance and long-term reliability of the battery.

How to obtain a battery that achieves both good electrochemical performance and dynamic performance is a common problem confronting the industry.

SUMMARY

In view of the problem in the background, the present application provides a negative electrode plate and a secondary battery including the electrode plate, to achieve both good cycling performance and dynamic performance without loss of energy density.

To achieve the foregoing objective, a first aspect of the present application provides a negative electrode plate, where the negative electrode plate includes a negative electrode current collector, a first negative electrode active substance layer disposed on at least one surface of the negative electrode current collector, and a second negative electrode active substance layer disposed on the first negative electrode active substance layer; the first negative electrode active substance layer includes a first negative electrode active substance, and the second negative electrode active substance layer includes a second negative electrode active substance; and the first negative electrode active substance satisfies 1 GPa≤Young's modulus≤10 GPa, and the second negative electrode active substance satisfies 11 GPa≤Young's modulus≤30 GPa.

A second aspect of the present application provides a secondary battery, including the negative electrode plate provided in the first aspect of the present application.

Compared with the prior art, the present application has the following beneficial effects:

The negative electrode plate provided in the present application includes double negative electrode active substance layers, and each active substance layer uses an active substance with a specific Young's modulus range. Compared with a negative electrode plate made of a single material, in the present application, the first negative electrode active substance layer uses the negative electrode active substance with a low Young's modulus, and the second negative electrode active substance layer uses the negative electrode active substance with a high Young's modulus. In the case of the same compaction density, a material with a higher Young's modulus has small deformation under pressure, and therefore a pore structure in an area of the surface layer of the electrode plate is not damaged. In addition, due to the small deformation of the upper layer, more forces can be transmitted to particles in the lower layer, thereby ensuring that particles in the upper and lower layers are under consistent pressure, and that the pore structure of the entire electrode plate is more conducive to the infiltration of an electrolyte and the transmission of active ions. On the one hand, a better pore structure is conducive to the retention of the electrolyte in the electrode plate during a cycle, thereby improving cycling performance of the battery. On the other hand, a diffusion rate of active ions is relatively fast, effectively improving dynamic performance of the battery. In general, the negative electrode plate provided in the present application enables the battery to achieve both good cycling performance and dynamic performance without loss of energy density.

DESCRIPTION OF EMBODIMENTS

The following describes in detail a negative electrode plate and a secondary battery in the present application.

A first aspect of the present application provides a negative electrode plate, where the negative electrode plate includes a negative electrode current collector, a first negative electrode active substance layer disposed on at least one surface of the negative electrode current collector, and a second negative electrode active substance layer disposed on the first negative electrode active substance layer; the first negative electrode active substance layer includes a first active substance, and the second active substance layer includes a second active substance; and the first active substance satisfies 1 GPa≤Young's modulus≤10 GPa, and the second active substance satisfies 11 GPa≤Young's modulus≤30 GPa.

The inventor of the present application has discovered through researches that when a negative electrode active substance with a higher Young's modulus and a negative electrode active substance with a lower Young's modulus are combined to form a negative electrode plate, and the negative electrode active substance with the higher Young's modulus is located at the upper layer, a pore structure in an area of the surface layer of the electrode plate obtained in such a way is not damaged because a material with a higher Young's modulus has small deformation under pressure. In addition, due to the small deformation of the upper layer, more forces can be transmitted to particles in the lower layer, thereby ensuring that particles in the upper and lower layers are under consistent pressure, and that the pore structure of the entire electrode plate is more conducive to the infiltration of an electrolyte and the transmission of active ions. This can effectively improve cycling performance and dynamic performance of the battery without loss of energy density of the battery.

In some embodiments of the present application, the Young's modulus (GPa) of the first negative electrode active substance may range from 1 GPa to 2 GPa, 2 GPa to 3 GPa, 3 GPa to 4 GPa, 4 GPa to 5 GPa, 5 GPa to 6 GPa, 6 GPa to 7 GPa, 7 GPa to 8 GPa, 8 GPa to 9 GPa, or 9 GPa to 10 GPa. Optionally, the Young's modulus of the first negative electrode active substance ranges from 4 GPa to 10 GPa, and optionally from 6 GPa to 10 GPa. If the Young's modulus of the first negative electrode active substance is too low, the lower active substance layer may be over-pressured, which causes a low porosity, failure to allow full infiltration of the electrolyte, and failure to bring a capacity per gram of the active substance into play, further affecting power and cycling performance. If the Young's modulus of the first negative electrode active substance is too high, the lower layer is not easily subject to pressure, and the upper layer is over-pressured, causing a failure to achieve the overall pressure evenness of the electrode plate.

In some embodiments of the present application, the Young's modulus of the second negative electrode active substance may range from 11 GPa to 12 GPa, 12 GPa to 13 GPa, 13 GPa to 14 GPa, 14 GPa to 15 GPa, 15 GPa to 16 GPa, 16 GPa to 17 GPa, 17 GPa to 18 GPa, 18 GPa to 19 GPa, 19 GPa to 20 GPa, 20 GPa to 22 GPa, 22 GPa to 24 GPa, 24 GPa to 26 GPa, 26 GPa to 28 GPa, or 28 GPa to 30 GPa. Optionally, the Young's modulus of the negative electrode active substance in the second negative electrode active substance layer ranges from 11 GPa to 20 GPa, and optionally from 12 GPa to 16 GPa.

In some embodiments of the present application, a difference between the Young's modulus of the second negative electrode active substance and the Young's modulus of the first negative electrode active substance ranges from 3 GPa to 12 GPa. For example, the difference may range from 3 GPa to 4 GPa, 4 GPa to 5 GPa, 5 GPa to 6 GPa, 6 GPa to 7 GPa, 7 GPa to 8 GPa, 8 GPa to 9 GPa, 9 GPa to 10 GPa, 10 GPa to 11 GPa, or 11 GPa to 12 GPa. Optionally, the difference is controlled within the range of 6 GPa to 10 GPa. Considering that the upper layer is more stressed than the lower layer during a cold pressing process, the Young's modulus of the upper and lower layers is controlled with a specific difference, which helps transmit more forces from the upper layer to the lower layer, and ensures consistent pressure on the upper and lower layers.

It should be noted that a value of the Young's modulus of the negative electrode active substance can be controlled by adjusting parameters of a material itself, for example, an average grain size, a porosity, and a specific surface area (BET) of the material, and particle shapes of the material.

Generally, the larger the average grain size of the material, the smaller its Young's modulus. Optionally, an average grain size of the first negative electrode active substance in the present application may be controlled within the range of 11 μm to 20 μm, for example, 11 μm to 13 μm, 13 μm to 15 μm, 15 μm to 17 μm, or 17 μm to 20 μm. Optionally, an average grain size of the second negative electrode active substance in the present application may be controlled within the range of 1 μm to 10 μm, for example, 1 μm to 3 μm, 3 μm to 5 μm, 5 μm to 7 μm, or 7 μm to 10 μm.

Generally, the larger the porosity of the material, the smaller its Young's modulus. Optionally, a porosity of the first negative electrode active substance in the present application may be controlled within the range of 25% to 40%, for example, may range from 25% to 27%, 27% to 29%, 29% to 31%, 31% to 33%, 33% to 35%, or 35% to 40%. Optionally, a porosity of the second negative electrode active substance in the present application may be controlled within the range of 10% to 20%. For example, its porosity may range from 10% to 12%, 12% to 14%, 14% to 16%, 16% to 18%, or 18% to 20%.

Generally, there are many factors that affect the specific surface area of the material, such as the porosity and grain size of the material. A relationship between the specific surface area of the material and its Young's modulus is also affected by the above parameters. For example, in the case of the same porosity, the larger the specific surface area, the larger the Young's modulus; in the case of the same grain size, a larger specific surface area may be caused by the increased porosity, and the Young's modulus decreases in this case. Optionally, a specific surface area (BET) of the first negative electrode active substance in the present application may be controlled within the range of 1 $m^2/g$ to 3 $m^2/g$, for example, may range from 1 $m^2/g$ to 1.5 $m^2/g$, 1.5 $m^2/g$ to 2 $m^2/g$, 2 $m^2/g$ to 2.5 $m^2/g$, or 2.5 $m^2/g$ to 3 $m^2/g$. Optionally, a specific surface area (BET) of the second negative electrode active substance in the present application may be controlled within the range of 4 $m^2/g$ to 8 $m^2/g$, for example, may range from 4 $m^2/g$ to 5 $m^2/g$, 5 $m^2/g$ to 6 $m^2/g$, 6 $m^2/g$ to 7 $m^2/g$, or 7 $m^2/g$ to 8 $m^2/g$.

In some embodiments of the present application, a coating weight per unit area of the first negative electrode active substance layer and/or the second negative electrode active substance layer ranges from 30 $g/m^2$ to 150 $g/m^2$, for example, 30 $g/m^2$ to 50 $g/m^2$, 50 $g/m^2$ to 70 $g/m^2$, 70 $g/m^2$ to 90 $g/m^2$, 90 $g/m^2$ to 110 $g/m^2$, 110 $g/m^2$ to 130 $g/m^2$, or 130 $g/m^2$ to 150 $g/m^2$, optionally 50 $g/m^2$ to 130 $g/m^2$. If the coating weight is too small, battery energy density is too low; if the coating weight is too large, the coating is prone to problems such as cracking.

In some embodiments of the present application, a thickness of the first negative electrode active substance layer and/or the second negative electrode active substance layer ranges from 20 μm to 150 μm, for example, 20 μm to 30 μm, 30 μm to 50 μm, 50 μm to 70 μm, 70 μm to 90 μm, 90 μm to 110 μm, 110 μm to 130 μm, or 130 μm to 150 μm, optionally 50 μm to 130 μm.

In some embodiments of the present application, a porosity of the first negative electrode active substance layer and/or the second negative electrode active substance layer ranges from 20% to 45%, for example, 20% to 25%, 25% to 30%, 30% to 35%, 35% to 40%, or 40% to 45%, optionally 25% to 40%.

In some embodiments of the present application, a porosity of the second negative electrode active substance layer is greater than or equal to a porosity of the first negative electrode active substance layer.

In the negative electrode plate provided in the present application, the negative electrode active substance (for example, the first negative electrode active substance and/or the second negative electrode active substance) may be various negative electrode active substances suitable for the secondary battery in the art. For example, the negative electrode active substance may include but is not limited to one or more of graphite, soft carbon, hard carbon, carbon fiber, carbonaceous mesophase spherule, silicon-based material, tin-based material, and lithium titanate. The graphite may be selected from one or more of artificial graphite, natural graphite, and modified graphite. The graphite may be further modified. The modification method of graphite is not specifically limited, which is optionally coating modification on the surface of the graphite core, and optionally amorphous carbon coating modification. The silicon-based material may be selected from one or more of elemental silicon, a silicon-oxygen compound, a silicon-carbon composite, and a silicon alloy. The tin-based material may be selected from one or more of elemental tin, a tin-oxygen compound, and a tin alloy.

In the negative electrode plate provided in the present application, the negative electrode active substance layer may further include a conductive agent and a bonding agent, and types and content of the conductive agent and the bonding agent are not specifically limited, and may be selected according to actual needs. For example, the conductive agent may include, but is not limited to, one or a combination of a branched conductive agent, a one-dimensional chain conductive agent, a two-dimensional sheet-like conductive agent, a polymer conductive agent, a carbon black conductive agent, and a graphite conductive agent; and more specifically, may include, but is not limited to, one or a combination of super-conductive carbon black, acetylene black, Ketjen black, carbon nanotubes CNTs, carbon fiber VGCF, flake graphite, graphene, polyacetylene, polythiophene, polypyrrole, polyaniline, polyphenylene, polyphenylene vinyl, and polydiacetylene. The bonding agent may include, but is not limited to, benzene rubber, polyacrylic acid, acrylate, styrene, allyl benzene, butadiene, acrylonitrile, acrylic acid, acrylamide, methyl acrylate, ethyl acrylate, or methyl methacrylate containing one or a combination of methyl, carboxyl, carbonyl, and nitrile.

In the negative electrode plate provided in the present application, the negative electrode current collector may be various materials suitable to be used as the negative electrode current collector of the secondary battery in the art. For example, the negative electrode current collector may include but is not limited to a metal foil, optionally a copper foil.

The negative electrode plate provided in the first aspect of the present application may be prepared by using methods well known in the art. For example, the preparation method for the negative electrode plate may include: forming the first negative electrode active substance layer on at least one surface of the negative electrode current collector, and forming the second negative electrode active substance layer on the first negative electrode active substance layer. Persons skilled in the art can usually select a suitable method to form the negative electrode active substance layer depending on the structure of the electrode plate. For example, a method such as a coating method, a spraying method, or a vapor deposition method may be used.

A second aspect of the present application provides a secondary battery, where the secondary battery includes the negative electrode plate provided in the first aspect of the present application.

The secondary battery provided in the present application further includes a positive electrode plate, a separator, and an electrolyte.

In the secondary battery provided in the present application, the positive electrode plate may usually include a positive electrode current collector and a positive electrode active substance layer, and the positive electrode active substance layer usually includes a positive electrode active substance. The positive electrode active substance may be various positive electrode active substances suitable for the secondary battery in the art. For example, the positive electrode active substance may include but is not limited to a lithium transition metal composite oxide. More specifically, the lithium transition metal composite oxide may include but is not limited to one or a combination of a lithium iron phosphide, a lithium iron manganese phosphide, a lithium cobalt oxide, a lithium nickel oxide, a lithium manganese oxide, a lithium nickel manganese oxide, a lithium nickel cobalt manganese oxide, a lithium nickel cobalt aluminum oxide, or a compound obtained by adding other transition metal or non-transition metal to these lithium transition metal oxides. The positive electrode current collector may be various materials suitable to be used as the positive electrode current collector of the secondary battery in the art. For example, the positive electrode current collector may include but is not limited to a metal foil, optionally a copper foil.

In the secondary battery provided in the present application, the separator may be various separators suitable for the secondary battery in the art, and specifically may include, but is not limited to, one or a combination of polyethylene, polypropylene, non-woven fabric, polyfiber material, and a multi-layer complex film thereof.

In the secondary battery provided in the present application, the electrolyte includes electrolyte salt and an organic solvent. Specific types and compositions of the electrolyte salt and the organic solvent are not specifically limited, and may be selected according to actual needs.

The secondary battery provided in the second aspect of the present application may be prepared by using methods well known in the art. For example, the preparation method for the secondary battery may include: stacking the positive electrode plate, the separator, and the negative electrode plate in order, so that the separator is placed between the positive and negative electrode plates as a function of isolation, and then performing winding to obtain a bare battery core; and placing the bare battery core in an outer package, drying it, injecting the electrolyte, and performing processes such as vacuum packaging, resting, formation, and shaping to obtain the secondary battery.

Beneficial effects of the present application are further described below with reference to embodiments.

To make the application objectives, technical solutions, and beneficial technical effects of the present application clearer, the present application is further described below in detail with reference to the embodiments. However, it should be understood that the embodiments of the present application are merely intended to explain the present application, but not to limit the present application, and the embodiments of the present application are not limited to the embodiments given in this specification. In embodiments in which specific experimental conditions or operating conditions are not specified, preparation is performed according to conventional conditions or according to conditions recommended by a material supplier.

In addition, it should be understood that the one or more method steps mentioned in the present application do not exclude that there may be other method steps before and after the combined steps or that other method steps may be inserted between these explicitly mentioned steps, unless otherwise specified. It should further be understood that the combination and connection relationship between one or more devices/apparatuses mentioned in the present application do not exclude that there may be other devices/apparatuses before and after the combined devices/apparatuses or that other devices/apparatuses may be inserted between the two explicitly mentioned devices/apparatuses, unless otherwise specified. Moreover, unless otherwise specified, the number of each method step is merely a convenient tool for identifying each method step, and is not intended to limit the sequence of the method steps or limit the scope of implementation of the present application. The change or adjustment of the relative relationship without substantial change in the technical content shall be deemed to fall within the implementable scope of the present application.

I. Preparation of a Battery for Testing

Example 1

Preparation of a positive electrode plate: Mix a positive electrode active material lithium iron phosphate, a conductive agent (Super P), and a bonding agent (PVDF) at a ratio of 96:2:2, add a solvent (NMP), and agitate them with a vacuum mixer until the system becomes evenly transparent, to obtain a positive electrode paste; evenly apply the positive electrode paste onto an aluminum foil of a positive electrode current collector; and after the positive electrode current collector coated with the positive electrode paste is aired at room temperature, transfer it to a drying oven for drying, and then perform processes such as cold pressing and cutting to obtain the positive electrode plate.

Preparation of a Negative Electrode Plate:

(1) Mix a first negative electrode active substance graphite, a conductive agent (Super P), CMC (carboxymethyl cellulose), and a bonding agent (styrene butadiene rubber) at a mass ratio of 94.5:1.5:1.5:2.5, and evenly mix them with a solvent (deionized water) with a vacuum mixer to prepare a first negative electrode paste, where a Young's modulus of the selected first negative electrode active substance is 1 GPa.

(2) Mix a second negative electrode active substance graphite, a conductive agent (Super P), CMC (carboxymethyl cellulose), and a bonding agent (styrene butadiene rubber) at a mass ratio of 94.5:1.5:1.5:2.5, and evenly mix them with a solvent (deionized water) with a vacuum mixer to prepare a second negative electrode paste, where a Young's modulus of the selected second negative electrode active material is 15 GPa.

(3) Evenly apply the first negative electrode paste on the negative electrode current collector copper foil to form a first negative electrode active substance layer, where a coating weight per unit area of the first negative electrode active substance layer is 80 g/m$^2$; evenly apply the second negative electrode paste on the first negative electrode active substance layer to form a second active substance layer, where a coating weight per unit area of the second active substance layer is 80 g/m$^2$; and after the layers are aired at room temperature, transfer them to a drying oven for drying, and then perform processes such as cold pressing and cutting to obtain the negative electrode plate.

Separator: Use a 12-Micron Polyethylene Film.

Electrolyte: Mix ethylene carbonate (EC), ethyl methyl carbonate (EMC), and diethyl carbonate (DEC) at a volume ratio of 1:1:1, and then dissolve fully dried lithium salt LiPF$_6$ in a mixed organic solvent at a proportion of 1 mol/L, to obtain the electrolyte.

Full battery preparation: Stack the positive electrode plate, the separator, and the negative electrode plate in order, so that the separator is placed between the positive and negative electrode plates as a function of isolation, and then perform winding to obtain a bare battery core; and place the bare battery core in an outer package, inject the prepared electrolyte into the dried bare battery core, and perform processes such as vacuum packaging, resting, formation, and shaping to obtain the lithium-ion secondary battery.

The preparation methods of examples 2 to 14 and comparative examples 1 to 8 are similar to the preparation method in example 1, except for the selected types and parameters of the first negative electrode active substance and the second negative electrode active substance. For the specific parameters, refer to Table 1.

II. Material Parameters and Battery Performance Testing Method

1. Young's modulus of the negative electrode active substance:

The Young's modulus of graphite is measured by the pulse excitation method. A Young's modulus of a material is related to its inherent frequency, The inherent frequency of the material can be measured and converted into the Young's modulus.

A. First, press a graphite sample into a square block sample with a specific length (10-20 mm), width (10-20 mm), and height (10-20 mm).

B. Then, fix the prepared sample on a stable test bench, and output a specific frequency (1-10000 Hz) to a probe by using a pulse tester, where the probe is used to knock on the sample.

C. Collect a variation curve of a sample amplitude with time in the testing process; after the testing is completed, select a frequency corresponding to a maximum amplitude point to obtain the inherent frequency of the material; and obtain the corresponding Young's modulus by using the formula.

2. The battery performance testing method in each example and comparative example is as follows:

(1) Battery Dynamic Performance Test:

At 25° C., lithium-ion batteries prepared in the examples and comparative examples are fully charged at 2.5 C and fully discharged at 1 C for 10 times, then the lithium-ion batteries are fully charged at 3 C, and then the negative electrode plate is taken down for viewing a status of lithium plating on the surface of the negative electrode plate. When the area of a lithium plating region on the surface of the negative electrode is less than 5%, it is considered to be slight lithium plating; when the area of a lithium plating region on the surface of the negative electrode ranges from 5% to 40%, it is considered to be moderate lithium plating; and when the area of a lithium plating region on the surface of the negative electrode is greater than 40%, it is considered to be severe lithium plating.

(2) Cycling Performance Test:

At 25° C., lithium-ion batteries prepared in the examples and comparative examples are charged at a rate of 1 C and discharged at a rate of 1 C for full charge and full discharge cycle testing, until capacities of the lithium-ion batteries degrade to 80% of their original capacities. Then the number of cycles is recorded.

For details about test results of examples and comparative examples, see Table 2.

TABLE 1

| No. | Type of the first negative electrode active substance | Young's modulus of the first negative electrode active substance (GPa) | Coating weight per unit area (g/m²) of the first negative electrode active substance | Porosity of the first negative electrode active substance (%) | Type of the second negative electrode active substance | Young's modulus of the second negative electrode active substance (GPa) | Coating weight per unit area (g/m²) of the second negative electrode active substance | Porosity of the second negative electrode active substance (%) |
|---|---|---|---|---|---|---|---|---|
| Example 1 | Graphite | 1 | 80 | 14.3 | Graphite | 15 | 80 | 58.3 |
| Example 2 | Graphite | 2.5 | 80 | 18.6 | Graphite | 15 | 80 | 52.7 |
| Example 3 | Graphite | 4 | 80 | 22.7 | Graphite | 15 | 80 | 48.5 |
| Example 4 | Graphite | 5 | 80 | 26.3 | Graphite | 15 | 80 | 44.6 |
| Example 5 | Graphite | 6 | 80 | 33.3 | Graphite | 15 | 80 | 35.3 |
| Example 6 | Graphite | 8 | 80 | 34.6 | Graphite | 15 | 80 | 36.8 |
| Example 7 | Graphite | 10 | 80 | 36.8 | Graphite | 15 | 80 | 32.3 |
| Example 8 | Graphite | 8 | 80 | 38.5 | Graphite | 11 | 80 | 30.5 |
| Example 9 | Graphite | 8 | 80 | 33.4 | Graphite | 16 | 80 | 35.3 |
| Example 10 | Graphite | 8 | 80 | 33.7 | Graphite | 18 | 80 | 35.6 |
| Example 11 | Graphite | 8 | 80 | 30.2 | Graphite | 20 | 80 | 38.3 |
| Example 12 | Graphite | 8 | 80 | 29.5 | Graphite | 25 | 80 | 49.6 |
| Example 13 | Graphite | 8 | 80 | 28.3 | Graphite | 30 | 80 | 50.3 |
| Example 14 | Graphite | 8 | 80 | 32.5 | Silicon oxide | 16 | 80 | 35.6 |
| Example 15 | Graphite | 8 | 80 | 34.2 | Silicon oxide | 14 | 80 | 33.9 |
| Example 16 | Graphite | 8 | 80 | 35.9 | Silicon oxide | 12 | 80 | 31.2 |
| Comparative example 1 | Graphite | 0.5 | 80 | 13.2 | Graphite | 15 | 80 | 58.7 |
| Comparative example 2 | Graphite | 11 | 80 | 37.3 | Graphite | 15 | 80 | 30.4 |
| Comparative example 3 | Graphite | 5 | 80 | 30.5 | Graphite | 10 | 80 | 24.2 |
| Comparative example 4 | Graphite | 5 | 80 | 18.8 | Graphite | 32 | 80 | 48.3 |
| Comparative example 5 | Graphite | 0.5 | 80 | 13.6 | Silicon oxide | 15 | 80 | 48.3 |
| Comparative example 6 | Graphite | 11 | 80 | 37.4 | Silicon oxide | 15 | 80 | 32.8 |
| Comparative example 7 | Graphite | 5 | 80 | 30.7 | Silicon oxide | 10 | 80 | 20.9 |
| Comparative example 8 | Graphite | 5 | 80 | 18.3 | Silicon oxide | 32 | 80 | 48.8 |

TABLE 2

| No. | Dynamic performance | Cycling performance/cycle |
|---|---|---|
| Example 1 | Slight lithium plating | 3032 |
| Example 2 | Slight lithium plating | 3134 |
| Example 3 | Slight lithium plating | 3333 |
| Example 4 | Slight lithium plating | 3489 |
| Example 5 | No lithium plating | 4128 |
| Example 6 | No lithium plating | 4229 |
| Example 7 | Slight lithium plating | 3343 |
| Example 8 | Slight lithium plating | 3437 |
| Example 9 | No lithium plating | 4237 |
| Example 10 | No lithium plating | 4467 |
| Example 11 | Slight lithium plating | 3563 |
| Example 12 | Slight lithium plating | 3582 |
| Example 13 | Slight lithium plating | 3457 |
| Example 14 | No lithium plating | 4161 |
| Example 15 | No lithium plating | 4087 |
| Example 16 | Slight lithium plating | 3562 |
| Comparative example 1 | Severe lithium plating | 2042 |
| Comparative example 2 | Moderate lithium plating | 2566 |
| Comparative example 3 | Moderate lithium plating | 2689 |
| Comparative example 4 | Moderate lithium plating | 2753 |
| Comparative example 5 | Severe lithium plating | 2068 |
| Comparative example 6 | Moderate lithium plating | 2943 |
| Comparative example 7 | Moderate lithium plating | 2848 |
| Comparative example 8 | Moderate lithium plating | 2859 |

First, it can be learned from examples 1 to 16 and comparative examples 1 to 8 that, when the Young's modulus of the first active substance ranges from 1 GPa to 10 GPa, and the Young's modulus of the second active substance ranges from 11 GPa and 30 GPa, the battery can achieve both good dynamic performance and excellent cycling performance. When either the Young's modulus of the first active substance or the Young's modulus of the second active substance is not within the given range, the battery cannot achieve good dynamic performance and cycling performance at the same time, and cannot meet the customer's requirements.

In addition, it can be learned from comparative examples 1 to 7 that, when the Young's modulus of the first active substance gradually increases within the given range, force absorption decreases due to its small deformation under force, and more forces act on the second active substance, causing a porosity of the first layer to gradually increase and that of the second layer to gradually decrease.

If the Young's modulus of the first active substance is too small (as in comparative example 1), its deformation under force is too large, and a porosity of the first layer becomes too low, causing deterioration of the infiltration of an electrolyte to the first layer, affecting performance of the first layer, and affecting power and cycling performance of the entire electrode plate.

If the Young's modulus of the first active substance is too large (as in comparative example 2), it is under a small force, deformation of the second layer under force is too large, and a porosity of the second layer is relatively low, causing a difficulty in the infiltration of an electrolyte to the entire electrode plate and relatively large performance deterioration of the entire electrode plate.

It can be learned from examples 8 to 13 that, when the Young's modulus of the second active substance gradually increases within the given range, the first layer remains unchanged, and as the Young's modulus of the second layer material increases, the second layer transfers more forces to the first layer. As a result, a porosity of the first layer gradually decreases, and that of the second layer increases, which is conducive to the infiltration of an electrolyte to the electrode plate and the transmission of lithium ions.

If the Young's modulus of the second active substance is too small (as in comparative example 3), an impact on its battery core is similar to that in comparative example 2, and the second layer has large deformation under force, which affects the infiltration of an electrolyte to the entire electrode plate.

If the Young's modulus of the second active substance is too large (as in comparative example 4), an impact on its battery core is similar to that in comparative example 1, and the first layer has large deformation under force, which affects the infiltration of an electrolyte to the lower layer of electrode plate.

In conclusion, the present application effectively overcomes various shortcomings in the prior art and has high industrial utilization value.

The foregoing embodiments only exemplarily illustrate the principles and effects of the present application, and are not intended to limit the present application. Any person familiar with this technology can make modifications or alterations to the foregoing embodiments without departing from the spirit and scope of the present application. Therefore, all equivalent modifications or alterations made by a person of ordinary skill in the technical field without departing from the spirit and technical ideas disclosed in the present application shall still fall within the claims of the present application.

What is claimed is:

1. A secondary battery, comprising a negative electrode plate, wherein:
   the negative electrode plate comprises a negative electrode current collector, a first negative electrode active substance layer disposed on at least one surface of the negative electrode current collector, and a second negative electrode active substance layer disposed on the first negative electrode active substance layer;
   the first negative electrode active substance layer comprises a first negative electrode active substance, and the second negative electrode active substance layer comprises a second negative electrode active substance; and
   the first negative electrode active substance satisfies 1 GPa≤Young's modulus≤10 GPa, and the second negative electrode active substance satisfies 11 GPa≤Young's modulus≤30 GPa.

2. The secondary battery according to claim 1, wherein the first negative electrode active substance satisfies 4 GPa≤Young's modulus≤10 GPa.

3. The secondary battery according to claim 2, wherein the first negative electrode active substance satisfies 6 GPa≤Young's modulus≤10 GPa.

4. The secondary battery according to claim 1, wherein the second negative electrode active substance satisfies 11 GPa≤Young's modulus≤20 GPa.

5. The secondary battery according to claim 4, wherein the second negative electrode active substance satisfies 12 GPa≤Young's modulus≤16 GPa.

6. The secondary battery according to claim 1, wherein a difference between the Young's modulus of the second negative electrode active substance and the Young's modulus of the first negative electrode active substance ranges from 3 GPa to 12 GPa.

7. The secondary battery according to claim 6, wherein the difference between the Young's modulus of the second negative electrode active substance and the Young's modulus of the first negative electrode active substance ranges from 6 GPa to 10 GPa.

8. The secondary battery according to claim 1, wherein an average grain size of the first negative electrode active substance ranges from 11 μm to 20 μm; or
   a specific surface area of the first negative electrode active substance ranges from 1 m$^2$/g to 3 m$^2$/g; or
   a porosity of the first negative electrode active substance ranges from 25% to 40%.

9. The secondary battery according to claim 1, wherein an average grain size of the second negative electrode active substance ranges from 1 μm to 10 μm; or
   a specific surface area of the second negative electrode active substance ranges from 4 m$^2$/g to 8 m$^2$/g; or
   a porosity of the second negative electrode active substance ranges from 10% to 20%.

10. The secondary battery according to claim 1, wherein the first negative electrode active substance and/or the second negative electrode active substance are separately selected from one or more of soft carbon, hard carbon, graphite, carbon fiber, carbonaceous mesophase spherule, silicon-based material, tin-based material, and lithium titanate.

11. The secondary battery according to claim 1, wherein a coating weight per unit area of the first negative electrode active substance layer or the second negative electrode active substance layer ranges from 30 g/m$^2$ to 150 g/m$^2$.

12. The secondary battery according to claim 1, wherein a thickness of the first negative electrode active substance layer or the second negative electrode active substance layer ranges from 20 μm to 150 μm.

13. The secondary battery according to claim 1, wherein a porosity of the first negative electrode active substance layer or the second negative electrode active substance layer ranges from 20% to 45%.

14. The secondary battery according to claim 13, wherein the porosity of the first negative electrode active substance layer or the second negative electrode active substance layer ranges from 25% to 40%.

15. The secondary battery according to claim 1, wherein a porosity of the second negative electrode active substance layer is greater than or equal to a porosity of the first negative electrode active substance layer.

* * * * *